April 11, 1967  C. F. CLURE  3,313,320
SAFETY DEVICE
Filed Feb. 28, 1964

Claremont F. Clure
INVENTOR.

BY

ATTORNEY

3,313,320
SAFETY DEVICE
Claremont F. Clure, P.O. Box 36425,
Houston, Tex. 77036
Filed Feb. 28, 1964, Ser. No. 348,035
1 Claim. (Cl. 138—89)

This invention relates to a safety device utilized for forming a positive releasable closure for an open conduit.

Many industrial reciprocating machines, such as steam engines, gas engines, diesel engines, reciprocating compressors and reciprocating pumps are provided with connections to each cylinder for the purpose of attaching to each cylinder a device for determining the mean indicated pressure of the cylinder. As is well known in the art, such determinations are utilized to ascertain various characteristics of the performance of the cylinder. In order to facilitate the attachment of an indicator for measuring the mean indicated pressure of a cylinder, the manufacturer or the user of the reciprocating machine usually connects an indicator cock to each cylinder. The indicator cock usually comprises a valve such as a globe valve which has its inlet connected to the cylinder and which has an outlet pipe which is threaded for attachment of the mean pressure indicator.

The indicator cock is normally closed except when the mean pressure indicator is attached. However, from time to time when the indicator cock is supposed to be closed, the vibration of the reciprocating machine may shake it open and cause it to leak. This not only reduces efficiency of the cylinder but furthermore when combustible fuels are utilized in an internal combustion engine or when combustible liquids or gases are being pumped or compressed, such combustible fluids may escape from the outlet of the indicator cock and cause a serious fire or explosion. The danger of fire or explosion is particularly great where such equipment is utilized in pipeline station, refineries, gasoline plants, etc.

According to the present invention, such dangers due to leakage can be avoided by the utilization of a device attached to the outlet of the indicator cock which provides a positive vibration-proof closure for such outlet. The invention provides a cap which is screwed onto the threaded outlet of the indicator cock and a threaded member engaging the cap and bearing against the open end of the outlet to form a positive closure. The jam nut principle is utilized to prevent the closure from vibrating loose.

Figure 1:
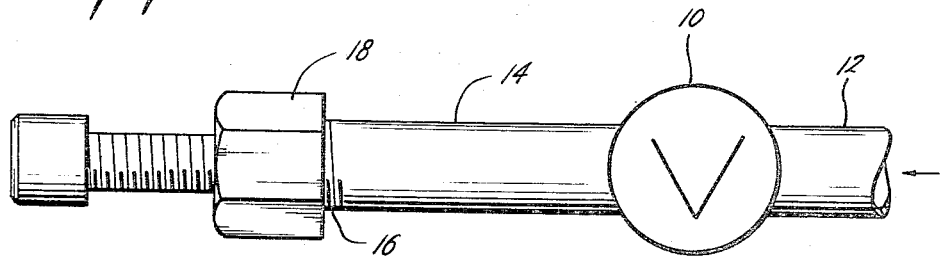
Figure 2:
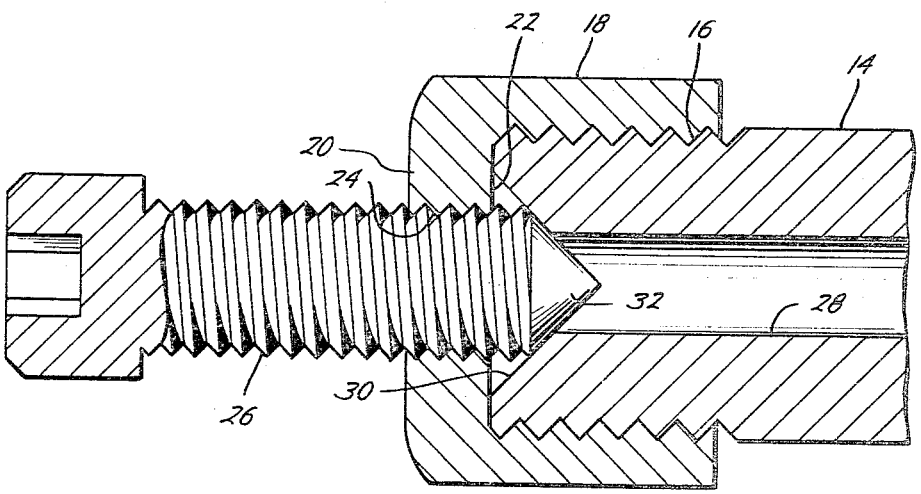

For a better understanding of the invention, reference is now made to the accompanying drawing wherein FIGURE 1 illustrates one embodiment of the invention attached to the outlet of an indicator cock, and FIGURE 2 is an enlarged cross-sectional view of the embodiment shown in FIGURE 1.

In FIGURE 1 there is shown an indicator cock 10 having an inlet conduit 12 and an outlet conduit 14 which is provided with threads 16. Such threads 16 are usually straight male threads rather than being tapered as pipe threads usually are. A cap-shaped member 18 having female threads corresponding to the threads 16 is shown in engagement with the threads 16. The cap-shaped member 18 is generally similar in configuration to a pipe cap but is preferably provided with a hexagonal or other polygonal exterior for engagement by a wrench. As best shown in FIGURE 2, the cap-shaped member is provided at its end with a radially inturned portion 20 which forms a shoulder 22 engaging the end of the outlet 14 and a threaded aperture 24 extending axially of and concentric with the outlet 14 and the cap 18. A threaded member, which may comprise for example a cap screw 26, is threadedly engaged in the threaded aperture 24. A socket head cap screw is illustrated in the drawing, but it is apparent that other types of threaded members having means thereon for engagement by a tool can be utilized. The end of the threaded member opposite the head is provided with means adapted to sealingly close the opening 28 through the outlet 14 of the indicator cock. Normally, this opening is beveled as shown at 30 in the drawing. In a preferred embodiment of the invention the end 32 of the cap screw is made conical in form to facilitate sealing closure of the opening 28.

The operation and use of the apparatus of this invention will be apparent from the foregoing description and the accompanying drawing. The cap 18 is first screwed onto the outlet 14 utnil the shoulder 22 is brought up tightly against the end of the outlet. The screw 26 is then threaded into the threaded aperture 24 until the conical point 32 is brought up tightly against the end of the opening 28, i.e. against the bevel 30, so as to provide a sealing closure. It is apparent that the tightening of the cap screw 26 causes a force to be exerted against the end 20 of the cap so as to put the cap under tension, while the inner end of the cap screw is under compression. Thus, the threaded connection between the cap screw and the cap and the threaded connection between the cap and the outlet 14 of the indicator cock together comprises means for locking each other, thereby providing a jam nut effect which prevents the threads from vibrating loose during operation of the reciprocating machine.

It is therefore apparent that there has been provided a novel safety device for use on various reciprocating machines such as internal combustion engines which provides a positive protection against leakage of gas or other combustible fluid from the cylinders through the indicator cock openings. Although a specific embodiment of the invention has been shown and described herein, the invention is not limited to this specific embodiment but only as set forth by the following claim.

What is claimed is:

Apparatus for positively sealing a male-threaded outlet of an indicator cock, said outlet being beveled at its opening and attached opposite thereof to a cylinder, which comprises:

(a) a cap-shaped member, internally thereof having first straight female threads adapted to engage the threads of said outlet, (b) an axially extending aperture through said cap provided with second straight female threads concentive with said first female threads, but of a lesser diameter, (c) a shoulder between the aperture and the larger threads adapted to abut the end of the outlet when the cap is screwed onto the outlet, (d) a cap screw engaged in said aperture threads, and (e) a conical end of no greater diameter than that of the threaded portion of the screw positioned on said cap screw pointing toward said outlet and said conical end being correlative in configuration to said beveled portion of said outlet, thereby being adapted to close said outlet upon screwing the cap screw into said aperture threads.

References Cited by the Examiner

UNITED STATES PATENTS

| 268,607 | 12/1882 | Bell | 151—14 |
| 631,534 | 8/1899 | Stanton | 151—14 X |
| 2,069,849 | 2/1937 | Rich | 138—89 |
| 2,336,173 | 12/1943 | Henderson | 251—225 |
| 3,203,460 | 8/1965 | Kuhne | 138—89 X |

FOREIGN PATENTS 152,467  10/1920  Great Britain.

LAVERNE D. GEIGER, *Primary Examiner.*

C. L. HOUCK, *Assistant Examiner.*